(12) United States Patent
Summerfield et al.

(10) Patent No.: US 12,235,079 B2
(45) Date of Patent: Feb. 25, 2025

(54) CLIP-ON RIFLESCOPE DISPLAY CLAMP

(71) Applicant: Cubic Corporation, San Diego, CA (US)

(72) Inventors: Abram Summerfield, Orofino, ID (US); Brian Bellah, Orofino, ID (US)

(73) Assignee: Cubic Corporation, San Diego, CA (US)

(*) Notice: Subject to any disclaimer, the term of this patent is extended or adjusted under 35 U.S.C. 154(b) by 180 days.

(21) Appl. No.: 17/977,390

(22) Filed: Oct. 31, 2022

(65) Prior Publication Data
US 2023/0175818 A1 Jun. 8, 2023

Related U.S. Application Data

(60) Provisional application No. 63/273,847, filed on Oct. 29, 2021.

(51) Int. Cl.
*F41G 11/00* (2006.01)
*G02B 7/18* (2021.01)

(52) U.S. Cl.
CPC .......... *F41G 11/004* (2013.01); *G02B 7/1805* (2013.01)

(58) Field of Classification Search
CPC .................... F41G 11/044; G02B 7/1805
See application file for complete search history.

(56) References Cited

U.S. PATENT DOCUMENTS

| | | | | |
|---|---|---|---|---|
| 5,816,683 A * | 10/1998 | Christiansen | ........... | F41C 27/00 362/110 |
| 6,732,987 B2 * | 5/2004 | Wooten | ................. | F41G 11/002 362/113 |
| 7,134,234 B1 * | 11/2006 | Makarounis | .......... | F41G 11/004 42/114 |
| 7,441,364 B2 * | 10/2008 | Rogers | .................. | F41G 11/003 42/114 |
| 7,870,688 B1 * | 1/2011 | Dasiukevich | .......... | F41G 11/004 42/117 |
| 8,397,419 B2 * | 3/2013 | Williams | .............. | F41G 11/003 42/90 |
| 8,683,732 B2 * | 4/2014 | Joplin | ................... | F41G 11/003 42/124 |
| 9,690,090 B2 * | 6/2017 | Russ | ....................... | F41G 1/345 |
| 9,791,320 B2 * | 10/2017 | McCreight, Jr. | ........ | G02B 23/16 |
| 10,845,162 B2 * | 11/2020 | Geissele | ................ | F41G 11/003 |

(Continued)

FOREIGN PATENT DOCUMENTS

DE 202021000644 U1 3/2021
WO 2018057872 A1 3/2018

*Primary Examiner* — Monica E Millner
(74) *Attorney, Agent, or Firm* — MUGHAL GAUDRY & FRANKLIN PC

(57) ABSTRACT

A clip-on display for mounting to a riflescope may include a clamp member. The clamp may include first lateral member. The clamp may include a second lateral member spaced apart from the first lateral member. The clamp may include a collar that extends between and couples the first lateral member and the second lateral member. The clamp may include a first clamp arm and a second clamp arm. Each of the first clamp arm and the second clamp arm may include a fixed end that extends from the first lateral member and a free end that is coupleable with the second lateral member to tighten the respective clamp arm. The clip-on display may include a beam splitter coupled with the clamp.

20 Claims, 12 Drawing Sheets

(56) References Cited

U.S. PATENT DOCUMENTS

| | | | |
|---|---|---|---|
| 11,092,437 B1* | 8/2021 | McCoy, II | F41G 1/54 |
| 11,946,724 B2* | 4/2024 | Gerber | F41G 11/003 |
| 2005/0045786 A1* | 3/2005 | Tupper | A01G 9/12 |
| | | | 248/230.1 |
| 2006/0026888 A1* | 2/2006 | Cheng | F41G 11/004 |
| | | | 42/146 |
| 2011/0023348 A1* | 2/2011 | Karagias | F41G 11/003 |
| | | | 42/124 |
| 2014/0226214 A1 | 8/2014 | Edwards et al. | |
| 2014/0230306 A1* | 8/2014 | Arachequesne | F41G 1/387 |
| | | | 42/119 |
| 2019/0285201 A1* | 9/2019 | Ruiz | F16L 23/10 |
| 2022/0049929 A1* | 2/2022 | Chen | F41G 3/065 |

* cited by examiner

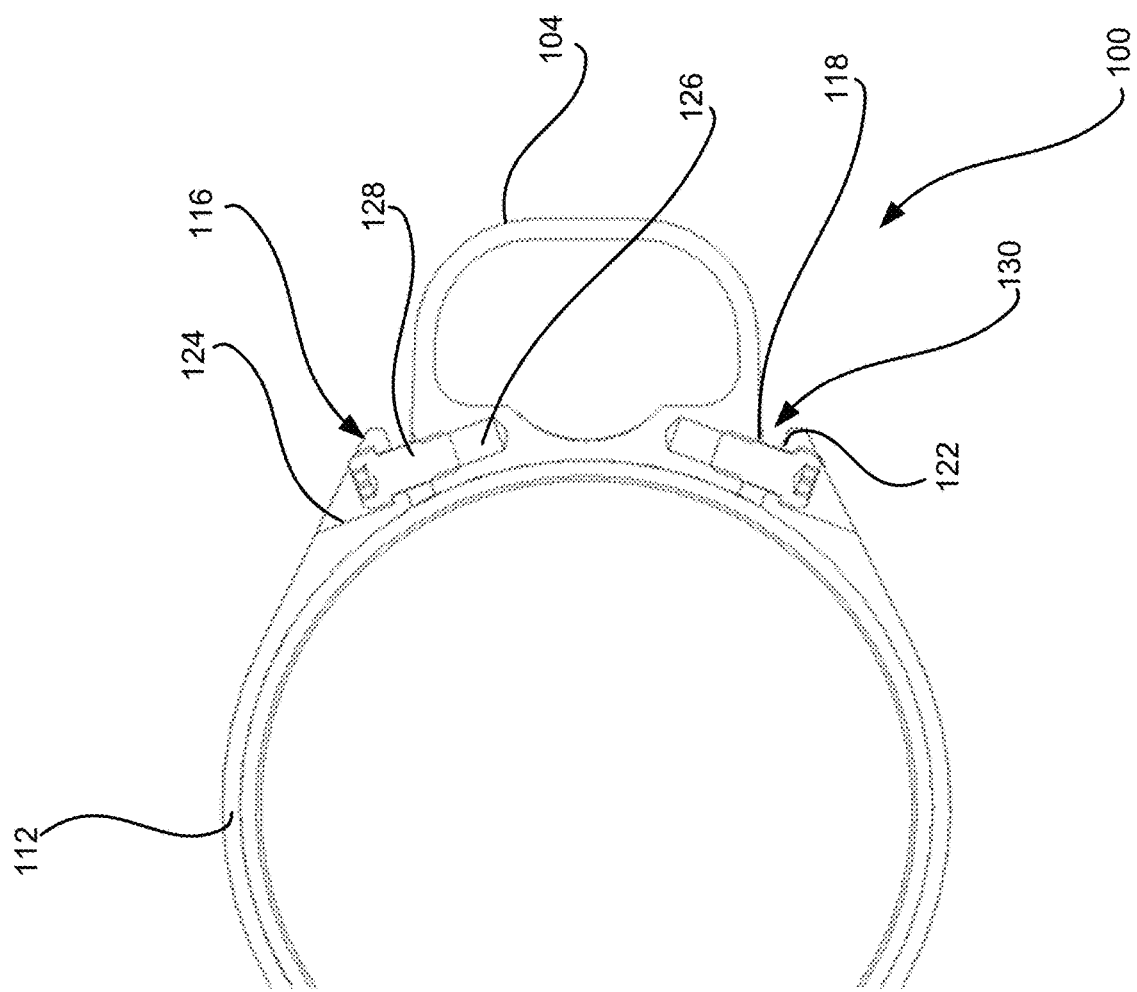

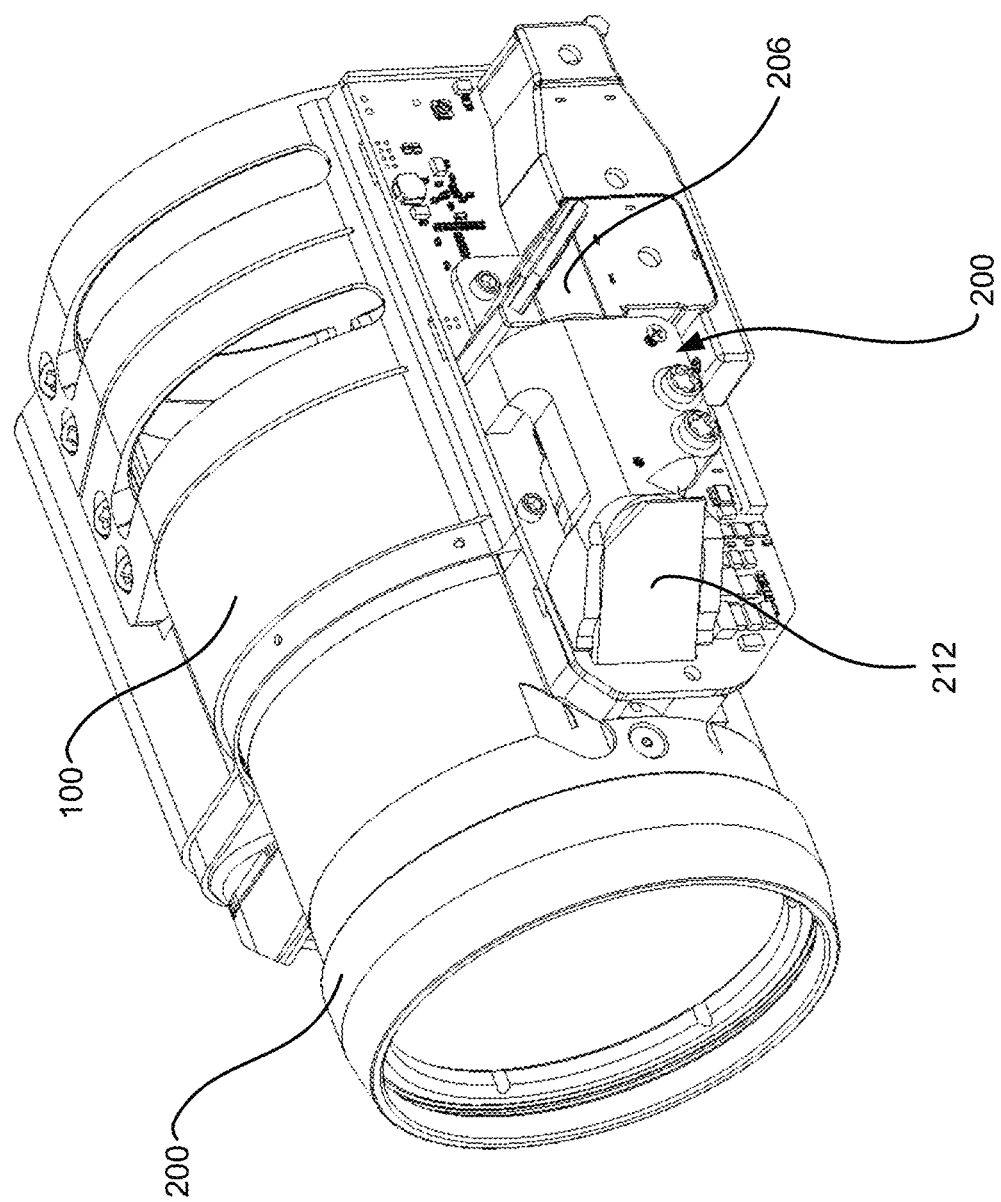

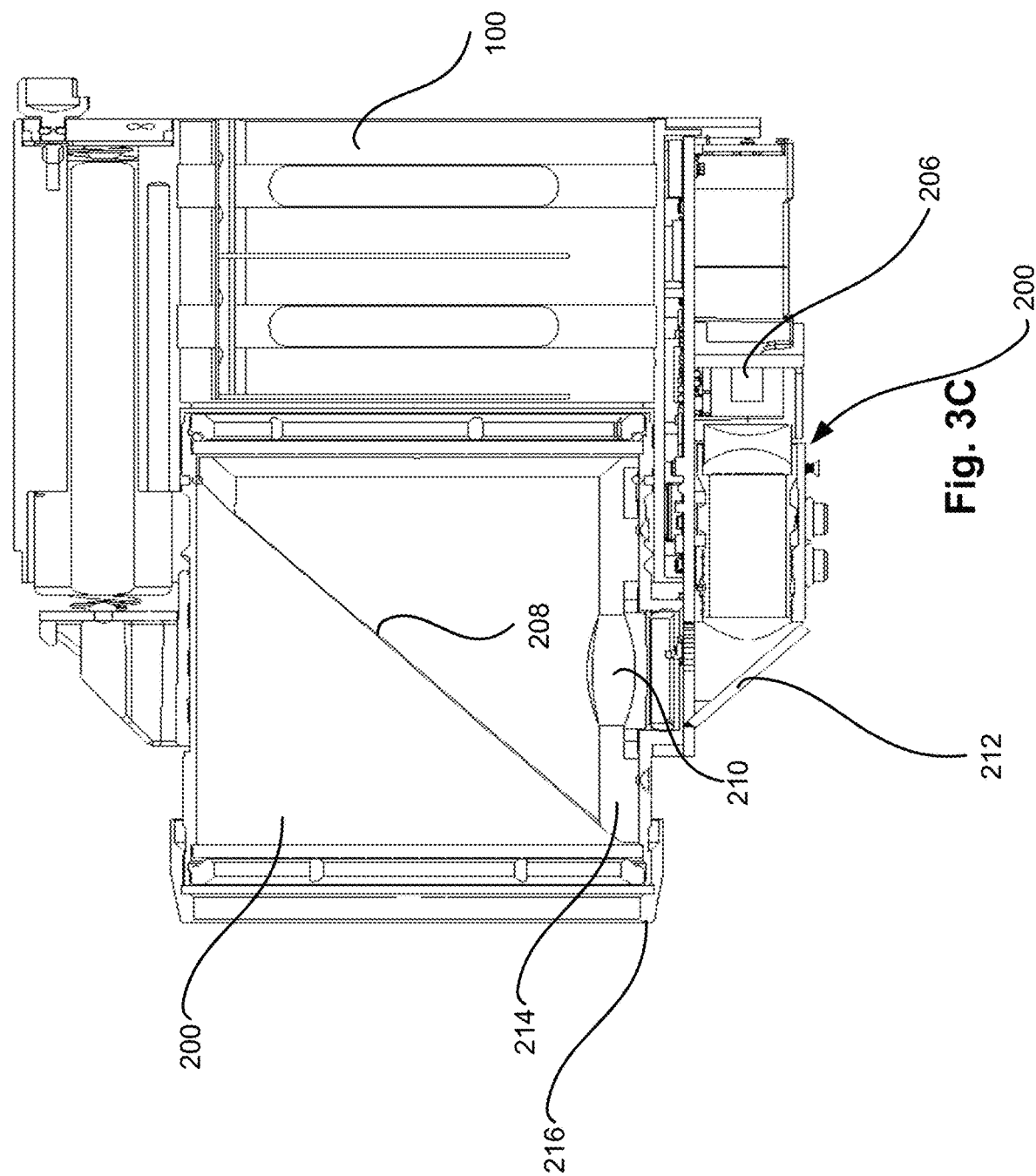

CLIP-ON RIFLESCOPE DISPLAY CLAMP

CROSS-REFERENCES TO RELATED APPLICATIONS

This application claims the benefit of U.S. Provisional Application Ser. No. 63/273,847, filed Oct. 29, 2021, entitled "CLIP-ON RIFLESCOPE DISPLAY CLAMP", the disclosure of which is incorporated by reference herein in its entirety.

BACKGROUND OF THE INVENTION

Smart scopes may refer to a class of fire control riflescopes that provides an overlay of the ballistically corrected aiming coordinates based on information such as a target range, gun/bullet type, atmospheric conditions, and/or other data. Conventional riflescopes may be retrofitted with head-up displays that may convert a traditional riflescope into a smart scope. However, the telescoping front of long-range riflescopes "dance" when subjected to gun shocks and may deflect up to 0.25 inches over the gun rail. While the scope itself is largely unaffected by the shocks since the scope is essentially a perfectly elastic pipe and returns to its original position after the shock, any attached peripheral (such as a head-up display) may experience slippage, creep, or other movement relative to the scope as result of such shocks. This movement may contribute to misalignment and/or other problems with the head-up display. Thus, improvements in mounting solutions for head-up displays on conventional riflescopes are desired.

BRIEF SUMMARY OF THE INVENTION

A clip-on display for mounting to a riflescope may include a clamp. The clamp may include first lateral member. The clamp may include a second lateral member spaced apart from the first lateral member. The clamp may include a collar that extends between and couples the first lateral member and the second lateral member. The clamp may include a first clamp arm and a second clamp arm. Each of the first clamp arm and the second clamp arm may include a fixed end that extends from the first lateral member and a free end that is coupleable with the second lateral member to tighten the respective clamp arm. The clip-on display may include a beam splitter coupled with the clamp.

In some embodiments, the first lateral member and the second lateral member may be disposed on substantially opposing surfaces of the collar. The collar may be cylindrical. The beam splitter may be disposed at an end of the clamp opposite the second clamp arm. The first lateral member may be a power unit. Each of the first clamp arm and the second clamp arm may be positioned about an objective-end of a riflescope. Each of the first clamp arm and the second clamp arm may be at least generally arc-shaped.

Some embodiments of the present technology may encompass clamps for mounting a beam splitter to a riflescope. The clamps may include a first lateral member. The clamps may include a second lateral member spaced apart from the first lateral member. The clamps may include a collar that extends between and couples the first lateral member and the second lateral member. The clamps may include at least one clamp arm. Each of the at least one clamp arm may include a fixed end that extends from the first lateral member and a free end that is coupleable with the second lateral member to tighten the respective clamp arm. An inner surface of each of the at least one clamp arm may include an arc-shaped surface.

In some embodiments, the fixed end of each of the at least one clamp arm may be coupleable with the second lateral member via one or more fasteners. A longitudinal axis of each of the one or more fasteners may extend tangentially to an arc of the respective clamp arm. Each of the at least one clamp arm may define at least one slit that extends along a portion of a length of the respective clamp arm. Each of the at least one clamp arm may define a groove that is positioned about the slit. The groove may extend 360 degrees. The at least one clamp arm may include a first clamp arm, a second clamp arm that is laterally spaced apart from the first clamp arm, a third clamp arm positioned opposite and facing the first clamp arm, and a fourth clamp arm positioned opposite from and facing the second clamp arm.

Some embodiments of the present technology may encompass clamps for mounting a beam splitter to a riflescope. The clamps may include a first lateral member. The clamps may include a second lateral member spaced apart from the first lateral member. The clamps may include a collar that extends between and couples the first lateral member and the second lateral member. The clamps may include a first clamp arm. The clamps may include a second clamp arm that is laterally spaced apart from the first clamp arm. The clamps may include a third clamp arm positioned opposite and facing the first clamp arm. The clamps may include a fourth clamp arm positioned opposite from and facing the second clamp arm. Each of the first clamp arm, the second clamp arm, the third clamp arm, and the fourth clamp arm may include a fixed end that extends from the first lateral member and a free end that is coupleable with the second lateral member to tighten the respective clamp arm.

In some embodiments, the free end of each of the first clamp arm and the second clamp arm may be coupleable with a first surface of the second lateral member. The free end of each of the third clamp arm and the fourth clamp arm may be coupleable with a second surface of the second lateral member opposite the first surface. The first clamp arm, the second clamp arm, the third clamp arm, the fourth clamp arm, the first lateral member, the second lateral member, and the collar may be formed integrally from a single piece of material. Each of the first clamp arm, the second clamp arm, the third clamp arm, the fourth clamp arm may define a slit that spans substantially all of a distance between the first lateral member and the second lateral member. The collar and each of the first clamp arm, the second clamp arm, the third clamp arm, the fourth clamp arm may have a substantially same outer diameter. An inner surface of each of the first clamp arm, the second clamp arm, the third clamp arm, the fourth clamp arm may include a roughened texture.

BRIEF DESCRIPTION OF THE DRAWINGS

A further understanding of the nature and advantages of the disclosed technology may be realized by reference to the remaining portions of the specification and the drawings.

FIG. 1E illustrates a cross-sectional front elevation view of the clamp of FIG. 1A.

FIG. 3A illustrates an isometric view of the clamp and beam splitter of FIG. 2A according to embodiments of the present invention.

FIG. 3C illustrates a sectional side elevation view of the clamp and beam splitter of FIG. 3A.

Figure 1A:
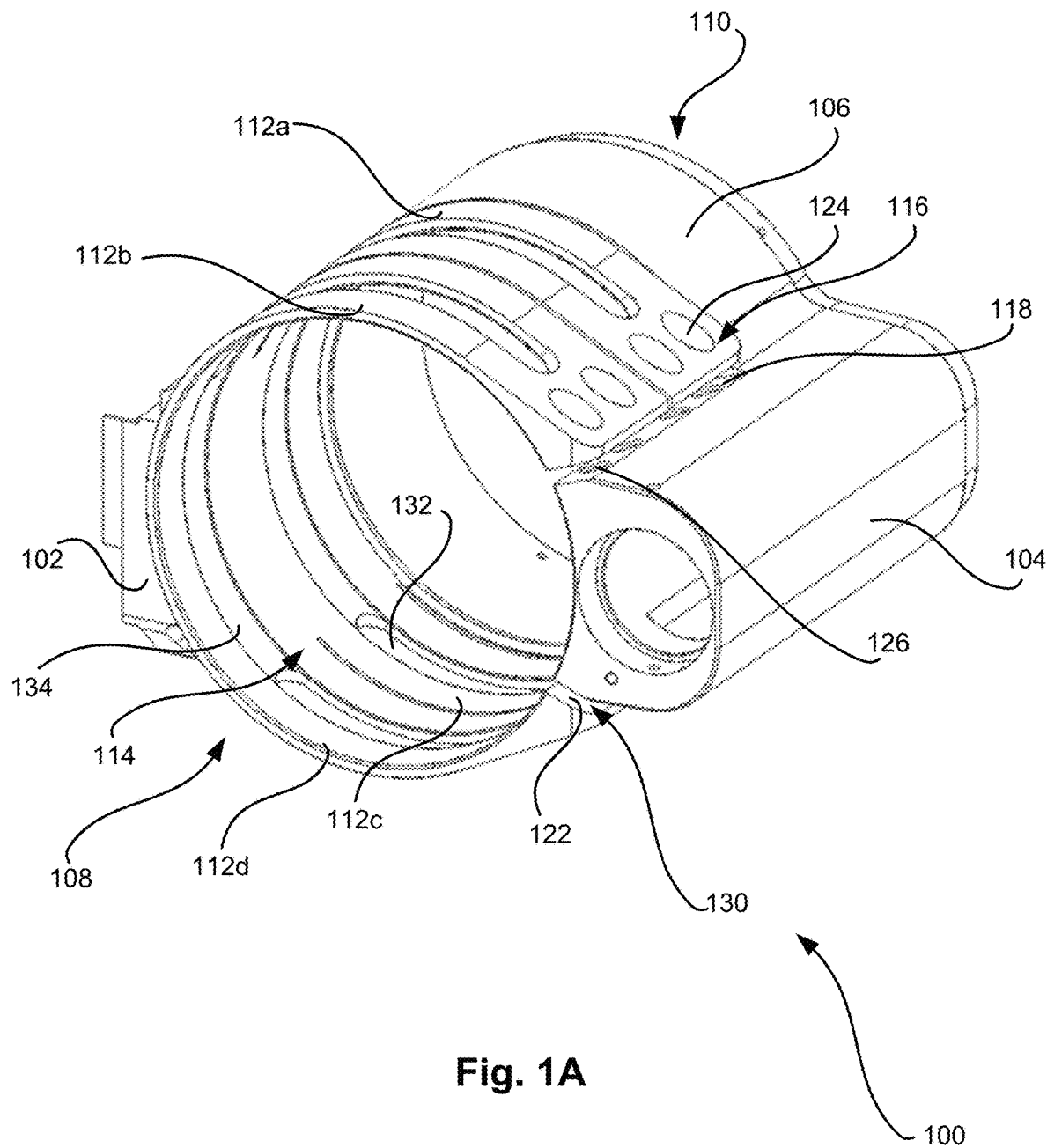
FIG. 1A illustrates a front isometric view of a clamp according to embodiments of the present technology.
Figure 1B:
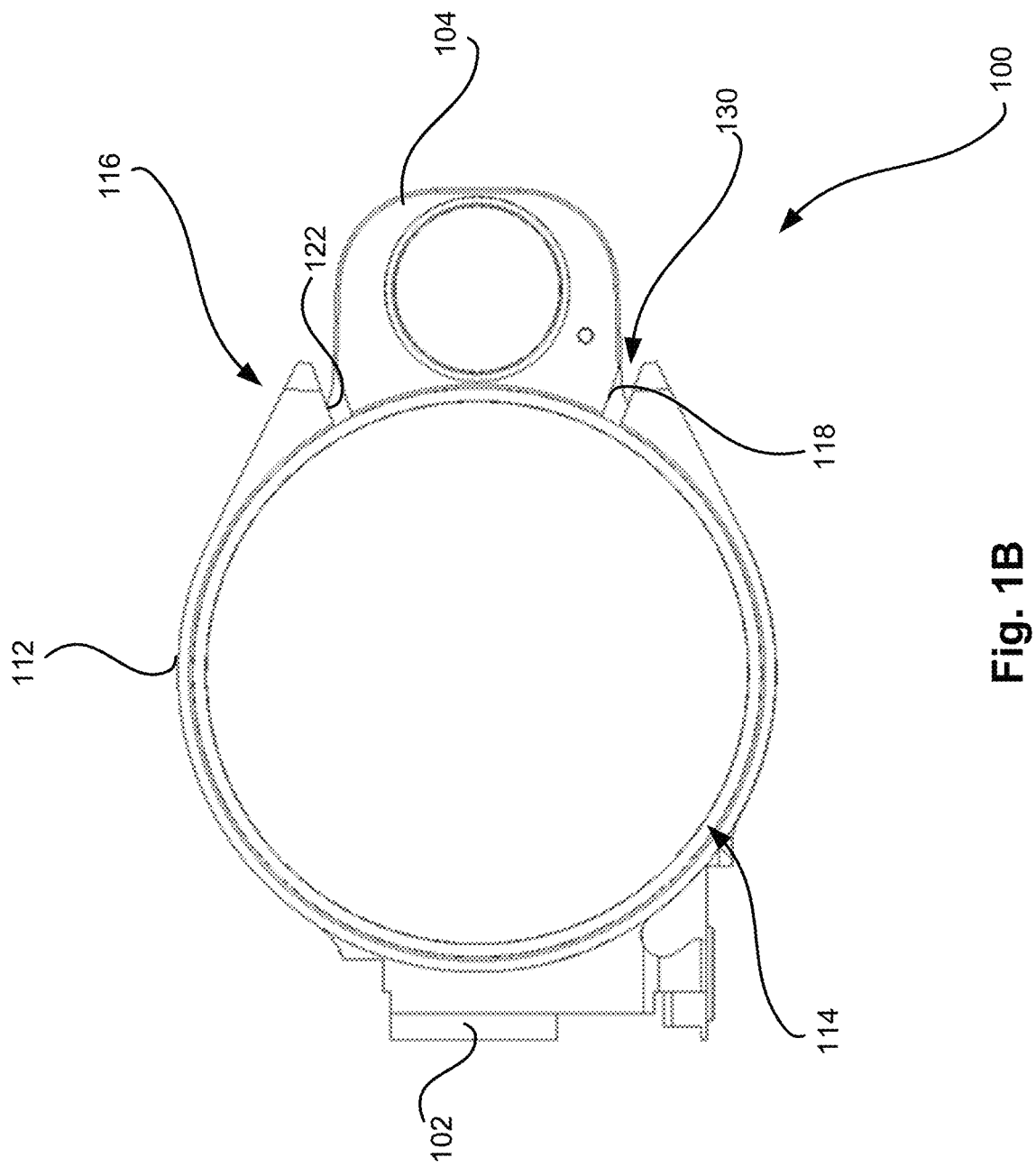
FIG. 1B illustrates a front elevation view of the clamp of FIG. 1A.
Figure 1C:
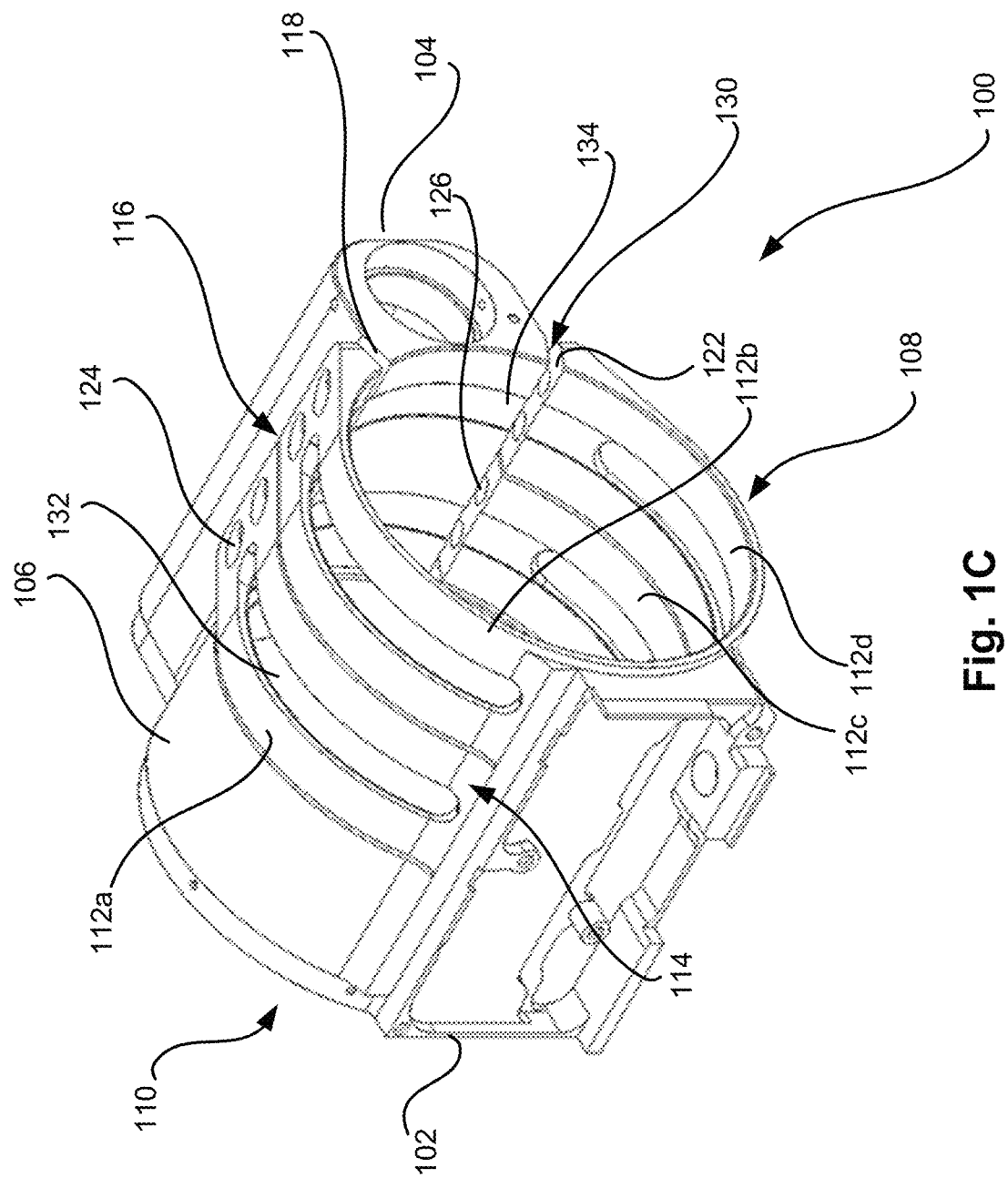
FIG. 1C illustrates a perspective view of the clamp of FIG. 1A.
Figure 1D:
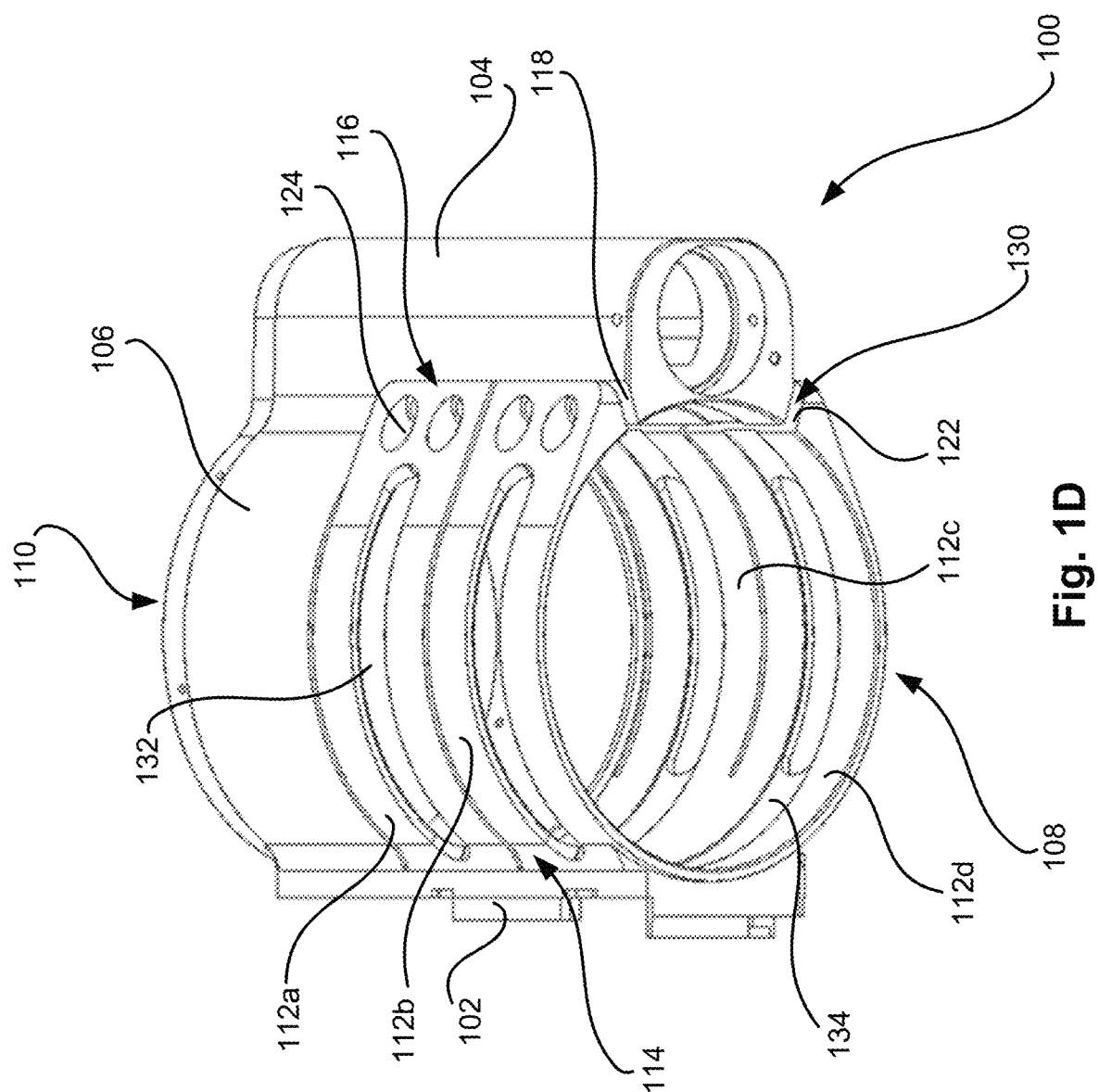
FIG. 1D illustrates a top perspective view of the clamp of FIG. 1A.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to clamps that are used for mounting a beam splitter and/or other head-up display to a riflescope. For example, the clamps may couple a head-up display to a conventional riflescope to convert the riflescope to a "smart scope" that provides an overlay of the ballistically corrected aiming coordinates. The clamps described herein provide a viable method to hold boresight when subjected to gun shocks, without the head-up display slipping or creeping in the event of a firing shock. Embodiments of the present invention may include clamps having adjustment ranges to accommodate and adapt to a wide range of riflescopes with various diameters.

Along with ensuring that the head-up displays do not move relative to the riflescope, the clamps described herein may enable the head-up displays to be securely mounted to riflescopes with tapered (or otherwise variable) outer diameters and/or riflescopes that have small non-uniformities in the outer diameter, such as due to manufacturing tolerances. In particular, the clamps may include two or more clamp arms that may be independently secured to grasp different portions of a riflescope. This may enable each clamp arm to be tightened against slightly different diameters or geometries, and may help alleviate any issues associated with clamping an object to a riflescope with highpoints and/or other variations in the outer diameter of the scope.

While discussed primarily with respect to securing beam splitters and/or other head-up displays to rifle scopes, it will be appreciated that the clamps described herein may be used in other applications. For example, the clamps described herein may be utilized in any application in which two objects must be secured together, and in particular in applications in which one object is to be clamped to another object that has a non-uniform outer diameter or other contour.

Turning now to FIG. 1A-1E, one embodiment of a clamp 100 is illustrated. Clamp 100 may include a first lateral member 102 and a second lateral member 104 that is spaced apart from the first lateral member 102. The lateral members 102, 104 may be coupled with one another via a collar 106 or other member that extends between the first lateral member 102 and the second lateral member. As illustrated, the collar 106 may be disposed at a distal end 110 of the clamp 100, with each of the first lateral member 102 and the second lateral member extending beyond the collar 106 in a direction of a proximal end 108 of the clamp 100. In other embodiments, the collar 106 may be disposed at different locations of the clamp 100, such as at a medial portion that is between the proximal and distal ends. For example, one or both of the first lateral member 102 and the second lateral member 104 may extend beyond the collar 106 in a direction of the distal end 110. As illustrated, the first lateral member 102 and the second lateral member 104 substantially oppose one another. For example, centers of each lateral member may be approximately 180 degrees apart (e.g., 160-200 degrees, 165-195 degrees, 170-190 degrees, 175-185 degrees) about a circumference or other periphery of the clamp 100. In other embodiments, the lateral members may be spaced at other intervals. Additionally, while shown with two lateral members, it will be appreciated that clamp 100 may include greater numbers of lateral members in various embodiments, such as three or more lateral members, four or more lateral members five or more lateral members, etc. The lateral members may be spaced apart from one another at regular and/or irregular intervals. Additionally, while shown as being on the sides of the clamp 100, in some embodiments, one or more lateral members may be positioned on the top and/or bottom of the clamp 100.

In some embodiments, the first lateral member 102 and/or the second lateral member 104 may form and/or include portions of a beam splitter and/or head-up display that is to be mounted using the clamp 100. For example, the first lateral member 102 may include a power unit (such as a battery, etc.) of the head-up display. The second lateral member 104 may include one or more processing members, sensors, imaging devices, and/or other components of the beam-splitter. It will be appreciated that the positioning of the various components of the beam splitter may be reversed or otherwise adjusted in some embodiments. As illustrated, the collar 106 is generally cylindrical in shape and extends 360 degrees about an interior of the clamp 100. The collar 106 may define a central aperture, such as a circular aperture in some embodiments. In some embodiments, the central aperture may be sized and shaped to slidingly receive an end (such as an objective end) of a riflescope. This may enable the clamp 100 to be secured to the riflescope such that the distal end 110 of the clamp is aligned or substantially aligned (e.g., within 25 mm, within 20 mm, within 15 mm, within 10 mm, within 5 mm, within 3 mm, within 1 mm, or less) with a distal end of the riflescope.

The clamp 100 may include one or more clamp arms 112 that may be used to secure the clamp 100 to an object, such as a riflescope. Each clamp arm 112 may include a fixed end 114 that extends from the first lateral member 102 and a free end 116 that is coupleable with the second lateral member 104 to tighten the respective clamp arm 112. For example, the fixed end 114 may be formed as part of the first lateral member 102 and each clamp arm 112 may extend away from the first lateral member 102 along an arc-shaped path until terminating at free end 116. Each clamp arm 112 may be flexed, pivoted, and/or otherwise moved relative to the first lateral member 102. For example, where the clamp arms 112 are formed integrally with the first lateral member 102, the clamp arms may be designed to flex within the elastic range of the material (e.g., below the elastic modulus of the material for a given radius of the inner surface of the clamp arm 112). This may enable each clamp arm 112 to be repeatedly loosened (e.g., pulled away from the second lateral member 104 such as to receive and/or remove the outer diameter of the riflescope) and/or tightened (e.g., forced toward the second lateral member 104 such as to secure the clamp 100 against the riflescope).

Each clamp arm 112 may be generally arc-shaped (e.g., may have an arc-shaped surface profile with some minor variations, such as a thicker free end 116) and/or may include an arc-shaped or substantially arc-shaped inner surface. This may enable the clamp arm 112 to engage a riflescope with a circular cross-section. It will be appreciated that the inner surface of each clamp arm 112 may have other shapes (e.g., variable contours, planar surfaces, etc.) that correspond with a shape of a mating surface of the riflescope in various embodiments. The free end 116 of each clamp arm 112 may taper outward, thicken, and/or otherwise provide sufficient material to facilitate mating of the free end 116 against a mating surface 118 of the second lateral member 104. As illustrated, each free end 116 is generally wedge-shaped, and provides a generally flat surface 122 that may be positioned against the mating surface 118 of the second lateral member 104. Each clamp arm 112 may define one or more fastener apertures 124, which may each be aligned and/or alignable with a respective fastener receptacle 126 defined within the mating surface 118. This may enable fasteners 126 (as best shown in FIG. 1E), such as screws. As illustrated, the fastener apertures 124 may include a countersink portion that may enable a head of the respective fastener 128 to sit below the outer surface of the clamp arm 112 when tightened. In some embodiments, an air gap 130 may be maintained between the mating surface 118 and the flat surface 122 when the fastener 128 is tightened. The air gap 130 may enable the clamp arm 112 to accommodate a range of outer diameters of riflescopes (or other objects) on which the clamp 100 is mounted. In other embodiments, the mating surface 118 and flat surface 122 may be in contact when the fastener 128 is tightened. Each clamp arm 112 may be tightened to a same or different degree (e.g., the size of air gap 130 may be the same or different for each clamp arm 112), oftentimes with a torque applied to each fastener 128 being equal across all fasteners 128/clamp arms 112).

In some embodiments, the flat surface 122 (when mated) and/or mating surface 118 may be aligned or substantially aligned (e.g., within 5 degrees, within 4 degrees, within 3 degrees, within 2 degrees, within 1 degree, or less) with a radius of the interior of the clamp 100 and/or the inner surface of the clamp arm 112. In such configurations, the fastener apertures 124 and/or fastener receptacles 126 may be machined and/or otherwise formed into the clamp arm 112 and/or second lateral member 104 such that a longitudinal axis of each aperture/receptacle is tangential to a circumference of the opening of the clamp 100 and inner surface of the clamp arm 112. This may enable each fastener 128 to be oriented such that a longitudinal axis of the fastener 128 may be tangential or substantially tangential (e.g., within about 5 degrees of tangential, within about 4 degrees, within about 3 degrees, within about 2 degrees, within about 1 degree, or less) to the circumference of the opening of the clamp 100 and inner surface of the clamp arm 112. By orienting the fasteners 128 at least substantially tangentially to the circumference of the opening of the clamp 100 and inner surface of the clamp arm 112, a uniform clamp force and/or clamp stress may be generated, which may help ensure that the clamp 100 (and attached head-up display) does not move relative to the riflescope when the rifle is fired.

Each clamp arm 112 may include one or more fasteners 128. The fasteners 128 for each clamp arm 112 may be distributed uniformly about the free end 116 of the clamp arm 112, which may help distribute the clamping forces and stresses uniformly. As illustrated, each clamp arm 112 includes two fasteners 128 arranged linearly along a width of the clamp arm 112, although any number and/or layout of fasteners 128 is possible in various embodiments. While illustrated as being planar, the flat surface 122 and/or mating surface 118 may be non-planar and may include one or more tapers, angled surfaces, contours, and/or other features that disrupt that planarity of the respective surface. In some embodiments, the surface 122 and mating surface 118 may include corresponding shapes (such as corresponding concave and convex portions) that enable the two surfaces to interface with one another such that the surfaces are substantially flush and/or otherwise in contact with one another.

In some embodiments, some or all of the clamp arms 112 may define at least one slit 132 that extends along at least a portion of a length of the clamp arm 112. For example, each slit 132 may extend along an arc-shaped path along the clamp arm 112. The slit 132 may extend about at least a portion of the length of the medial portion of the clamp arm 112 that extends between the fixed end 114 and the free end 116. In some embodiments, the slit 132 may span substantially all of a distance between the first lateral member 102 and the second lateral member 104. For example, the slit 132 may extend along at least 75% of the distance between the first lateral member 102 and the second lateral member 104, at least 80% of the distance, at least 85% of the distance, at least 90% of the distance, at least 95% of the distance, at least 97% of the distance, at least 99% of the distance, or more. The presence of each slit 132 may divide a medial region of each clamp arm 112 into two or more members, which may help concentrate the clamping force along a smaller area, which may increase the clamping pressure applied to the outer surface of the riflescope.

In some embodiments, the clamp 100 may define one or more grooves 134 that may extend about all or part of an inner surface of the clamp 100. For example, the grooves 134 may be disposed about one or more of the slits 132 to create a stand-off about the slit 132 and may further decrease the contact area between the clamp 100 and the riflescope. This decreased contact area may concentrate the clamping force along a smaller area, which may increase the clamping pressure applied to the outer surface of the riflescope. In some embodiments, each groove 134 may extend about only a portion of the inner surface of the clamp 100. For example, each groove 134 may extend about at least 5% of the circumference of the inner surface, at least 10% of the circumference (e.g., at least 36 degrees), at least 25% of the circumference (e.g., at least 90 degrees), at least 50% of the circumference (e.g., at least 180 degrees), at least 75% of the circumference (e.g., at least 270 degrees), at least 90% of the circumference (e.g., at least 324 degrees), at least 95% of the circumference (e.g., at least 342 degrees), or all of the circumference (e.g., 360 degrees). For example, in some embodiments, each groove 134 may extend along all or part of one or more clamp arms 112 (such as a bottom and top clamp arm), the first lateral member 102, and/or the second lateral member 104. In some embodiments, a single groove 134 may be positioned at a given position between the proximal end 108 and the distal end 110, while in other embodiments, multiple grooves 134 that are less than 360 degrees may be disposed at a given position between the proximal end 108 and distal end 110. In some embodiments, a depth of each groove 134 may be between about 0.05 inch and 0.25 inch, between about 0.1 inch and 0.2 inch, or about 0.15 inch, although other depths are possible in various embodiments. While being illustrated as being disposed about each slit 132, it will be appreciated that one or more grooves 134 may be disposed at any other location about the inner surface to decrease the contact area between the clamp 100 and the riflescope.

Clamp 100 may include two or more clamp arms 112. For example, the clamp 100 may include at least two clamp arms 112, at least three claim arms 112, at least four clamp arms 112, at least five clamp arms 112, at least six clamp arms 112, at least eight clamp arms 112, at least ten clamp arms 112, or more. Each clamp arm 112 may have the same or different general structure (e.g., width, size/number of slits, size/number of grooves, size/number of fasteners, etc.). As illustrated, each clamp arm 112 has a same general structure. Each clamp arm 112 may extend about a portion of the circumference of the clamp 100. For example, each clamp arm 112 may extend about between 25% and 75% of the circumference, between 30% and 70%, between 35% and 60%, between 40% and 55%, or between 45% and 50%. A length of each clamp arm 112 may depend on a number of clamp arms 112 disposed at a given point between the proximal end 108 and the distal end 110. For example, if a single clamp arm 112 is present at a single point, the clamp arm may be longer (e.g., extend about a greater portion of the circumference of the clamp 100) than where multiple clamp arms 112 are provided at a given point.

As illustrated, clamp 100 includes four clamp arms 112. A first clamp arm 112a may be positioned alongside the collar 106 on a top side of the first lateral member 102 and the second lateral member 104. A second clamp arm 112b may be positioned alongside, parallel to, and laterally spaced apart from the first clamp arm 112a. A third clamp arm 112c may be positioned opposite and facing the first clamp arm 112a. For example, the third clamp arm 112c may be disposed on a bottom side of the first lateral member 102 and the second lateral member 104 and may be positioned alongside the collar 106. A fourth clamp arm 112d may be positioned opposite from and may face the second clamp arm 112b, with the fourth clamp arm 112d being positioned alongside, parallel to, and laterally spaced apart from the third clamp arm 112c. In some embodiments, the second clamp arm 112b and the fourth clamp arm 112d may be positioned at the proximal end 105 of the clamp 100. Each clamp arm 112 may be oriented such that a concave arced surface faces an interior of the clamp 100 to form a generally circular opening that may receive the distal end of a riflescope.

As noted above, the free end 116 of each clamp arm 112 may be coupled with a mating surface 118 of the second lateral member 104 to tighten the clamp 100. For example, each of the first clamp arm 112a and the second clamp arm 112b may be coupleable with a first mating surface 118a that is on a top side of the second lateral member 104, and each of the third clamp arm 112c and the fourth clamp arm 112d may be coupleable with a second mating surface 118b that is on a lower surface of the second lateral member 104. In some embodiments, each claim arm 112 may have a substantially same (e.g., within 10%, within 5%, within 3%, within 1%, or less) outer diameter as the collar 110, which may provide a substantially uniform outer surface. By providing two or more clamp arms 112 along a length of the clamp 100, the clamp 100 may be securely mounted to riflescopes with tapered (or otherwise variable) outer diameters and/or riflescopes that have small non-uniformities in the outer diameter, such as due to manufacturing tolerances. For example, each clamp arm 112 may be tightened against slightly different diameters or geometries of the riflescope, which may help alleviate any issues associated with clamping an object to a riflescope with highpoints and/or other variations in the outer diameter of the scope.

In some embodiments, an inner surface of all or a portion of the clamp 100 may include a roughened texture. For example, the inner surfaces of the first lateral member 102, second lateral member 104, collar 106, and/or some or all of the clamp arms 112 may include a rough surface finish (e.g., non-polished finish). In a particular embodiment, the roughened texture may include a bead or sand-blasted finish. In some embodiments, the finish of the inner surface may be selected to match a surface finish of the outer surface of the riflescope, which may increase the sliding friction and clamping force between the clamp 100 and the riflescope.

In some embodiments, the clamp 100 may be formed from a number of pieces of material that are separately formed and later joined. For example, the clamp arms 112 may be pivotally and/or rotatably coupled with the first lateral member 102. In other embodiments, several components of the clamp 100 may be integrally formed from a single piece of material. For example, the collar 106, first lateral member 102, second lateral member 104, and/or clamp arms 112 may be machined and/or otherwise formed from a single piece of material. For example, a cylindrical tube of material may have a number of slits cut or otherwise formed to produce the clamp arms 112, and slits 132 and/or grooves 134 may be formed by removing material from the clamp arms. The clamp 100 may be formed from metal (such as aluminum or titanium), plastic or reinforced plastic, and/or other strong, lightweight materials in various embodiments.

Figure 2A:
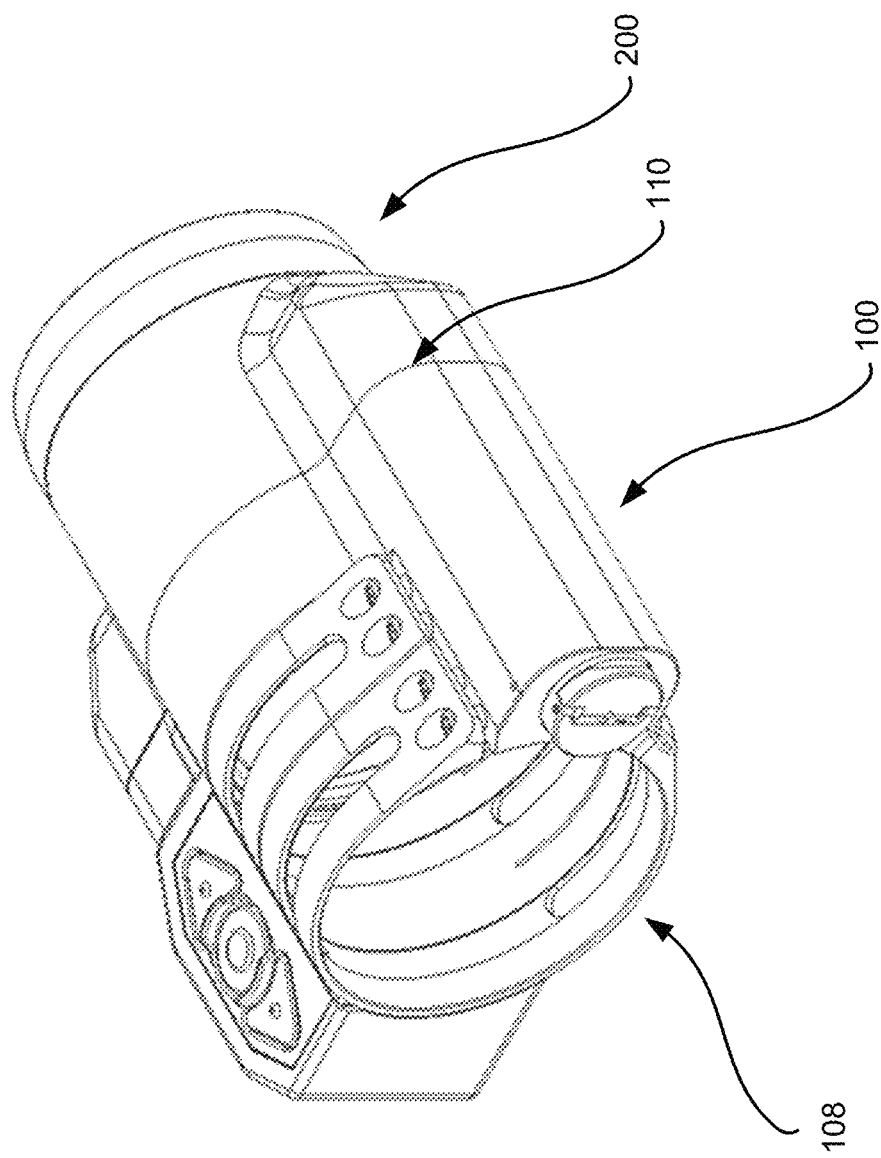
FIG. 2A is a front isometric view of the clamp of FIG. 1A coupled with a beam splitter.
Figure 2B:
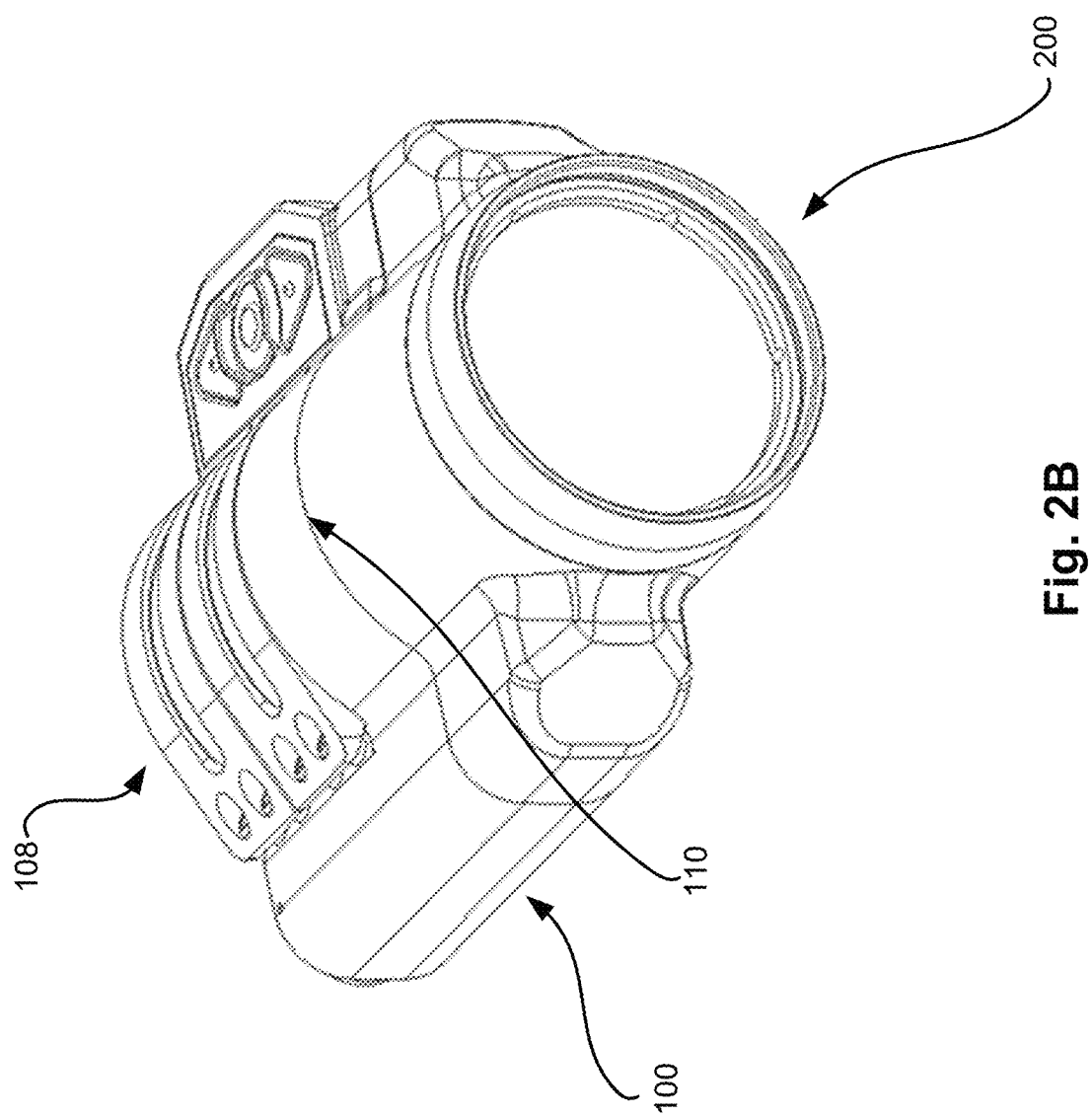
FIG. 2B is a rear isometric view of the clamp of FIG. 1A coupled with the beam splitter.
Figure 3B:
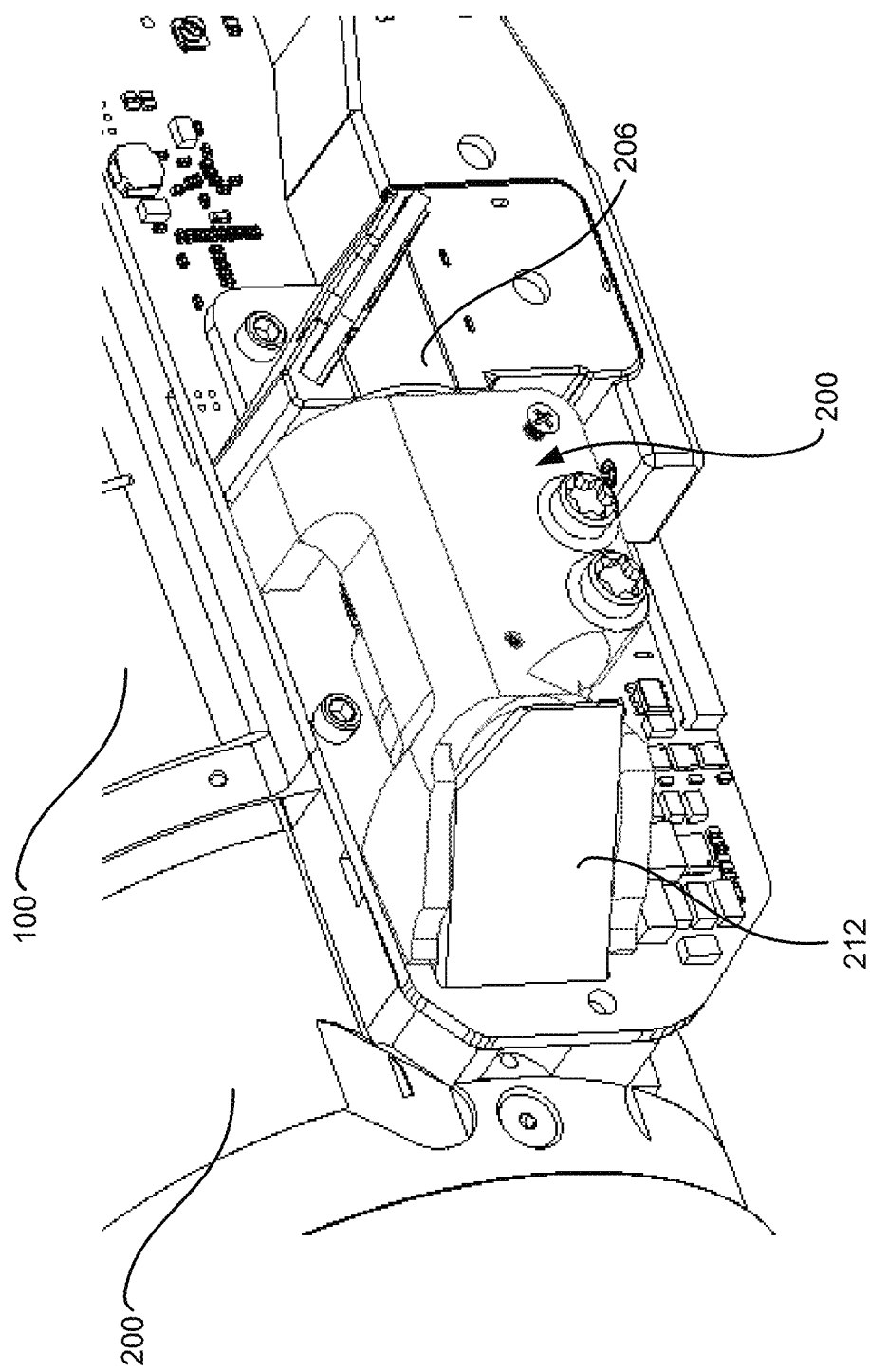
FIG. 3B illustrates a partial isometric view of the clamp and beam splitter of FIG. 3A.
Figure 3D:
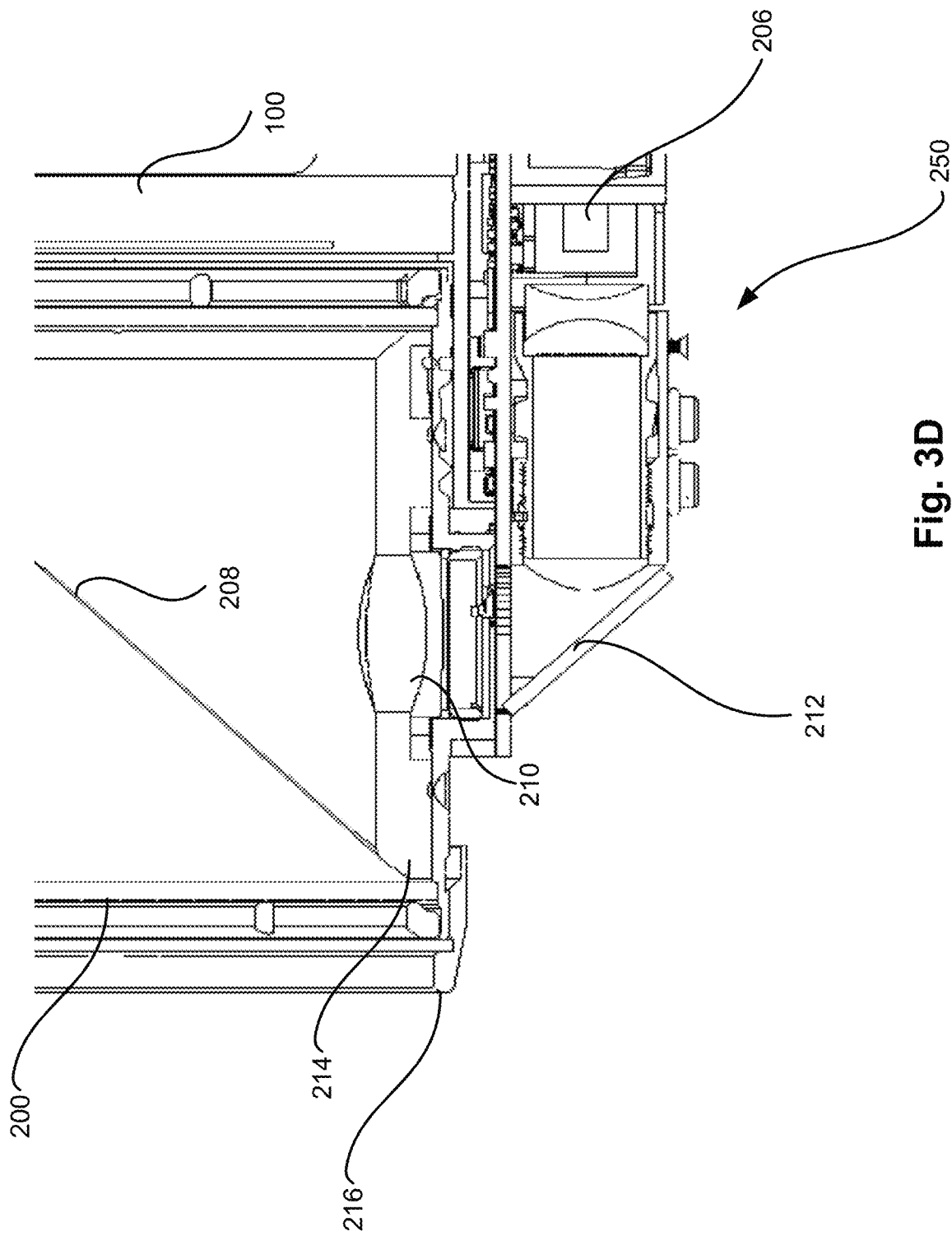
FIG. 3D illustrates a partial sectional side elevation view of the clamp and beam splitter of FIG. 3A.

FIGS. 2A and 2B illustrate clamp 100 being coupled with a beam splitter 200. For example, the beam splitter 200 may be coupled with the distal end 110 of the clamp 100. In a particular embodiment, the beam splitter 200 may be adhered to the distal end 110 using an adhesive, while in other embodiments, tone or more fasteners, clamps, and/or other coupling devices may be used to secure the clamp 100 with the beam splitter 200. In some embodiments, an outer diameter and/or other outer geometry of the clamp 100 may match or may substantially match the outer diameter and/or other outer geometry of the beam splitter 200 to provide a generally uniform component. The central opening of the clamp 100 may be coaxial with the sight of the beam splitter 200, which may enable a user to view the beam splitter 200 through the clamp 100.

FIGS. 3A-3D illustrate one embodiment of beam splitter 200 coupled with clamp 100. Disposed beneath the beam splitter 200 and/or clamp 100 may be an image device 206 that may be optically coupled with a reflective surface 208 of the beam splitter 200. Image device 206 may include one or more image capture devices, such as cameras, and/or one or more image generator devices, such as projectors. As illustrated, the image device 206 may enable information to be projected and/or otherwise overlaid over a portion of the field of view of a riflescope, such as by projecting the image onto the beam splitter 200. In other embodiments, the beam splitter 200 may be used to transmit data from the field of view of the scope to an image capture device. For example, the orientation of the beam splitter 200 may be reversed such that the reflective surface 208 slopes downward from front to back. The reflective surface 208 may then reflect a portion of the image viewed through the scope and beam splitter 200 into the image capture device. In some embodiments, an optical axis of the image device 206 may be aligned with the optical axis of a lens 210 of the beam splitter 200 and a second optical axis (that is orthogonal to the longitudinal axis of the scope and coaxial with the optical axis of the lens 210) of the reflective surface 208. However, as illustrated, the image device 206 is disposed in a manner such that the optical axis of the image device 206 is orthogonal to the optical axis of the lens 210 and the second optical axis of the reflective surface 208. In such configurations, a reflector 212, such as a mirror, may be positioned (such as at a 45 degree angle relative to the orthogonal axes) and used to optically couple the optical axis of the image device 206 with the optical axis of the lens 210 and the second optical axis of the reflective surface 208. It will be appreciated that numerous other configurations of the various optical axes may be utilized, with any number (including zero) of reflectors being used to optically couple the various components. A focus mechanism 250 may be incorporated into the image device 206 and/or may be disposed between the image device 206 and the reflector 212, which may enable adjustments of the lens 210 of the focus mechanism 250 to help focus optical data being exchanged between the beam splitter 200 and image device 206.

In some embodiments, the reflecting surface 208 of the beam splitter 200 may be in the form of a pellicle, which may have a flatness of within about 0.5 waves (λ/2) or better for a 25× magnification riflescope. The pellicle may have a thickness of less than about 100 microns. For example, the thickness may be between or about 2 microns and 100 microns, between or about 2 microns and 90 microns, between or about 2 microns and 80 microns, between or about 2 microns and 70 microns, between or about 2 microns and 60 microns, between or about 2 microns and 50 microns, between or about 2 microns and 40 microns, between or about 2 microns and 30 microns, between or about 2 microns and 25 microns, between or about 2 microns and 20 microns, or between or about 10 microns and 20 microns. By making the pellicle sufficiently flat and sufficiently thin, wavefront deformation of the pellicle may be substantially or entirely eliminated, which may result in better image quality/resolution through the primary optic.

The pellicle may be mounted on a pellicle frame 214 that is disposed within a housing 216 of the beam splitter 200. The pellicle frame 214 may include a spine that extends outward from an outer surface of the pellicle frame and that is used to secure the pellicle frame 214 with an inner surface of the housing, while a substantial portion of the pellicle frame 214 is separated from the inner surface of the housing by an air gap. For example, the spine may include less than or about 20% of the entire outer surface, less than or about 15%, less than or about 10%, less than or about 5%, or less. In embodiments in which a cross-section of the outer surface is generally circular, the spine may extend along less than or about 72 degrees of the cross-section, less than or about 54 degrees, less than or about 36 degrees, less than or about 18 degrees, less than or about 9 degrees, or less.

The air gap may enable the pellicle frame 214 (and pellicle) to be substantially floating relative to the housing 216. By substantially floating the pellicle frame 214 and pellicle, the beam splitter 200 may enable thermal expansion of the various components without risk of deformation of the pellicle. Additionally, when mounted on a scope, the substantially floating nature of the pellicle and pellicle frame 214 may help prevent the pellicle from being impacted (e.g., being distorted, deformed, and/or otherwise damaged) by outside forces, such as physical hoop stresses that may apply a crushing force to the housing 216.

Figure 4A:
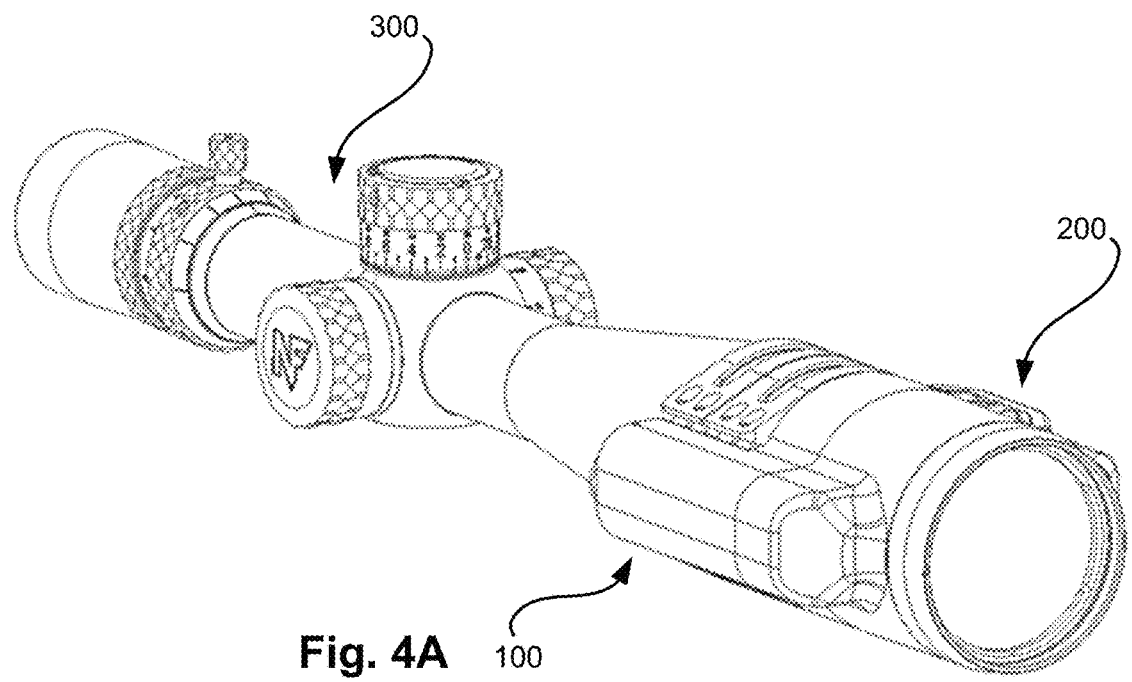
FIG. 4A illustrates a front isometric view of a smart scope assembly according to embodiments of the present technology.
Figure 4B:
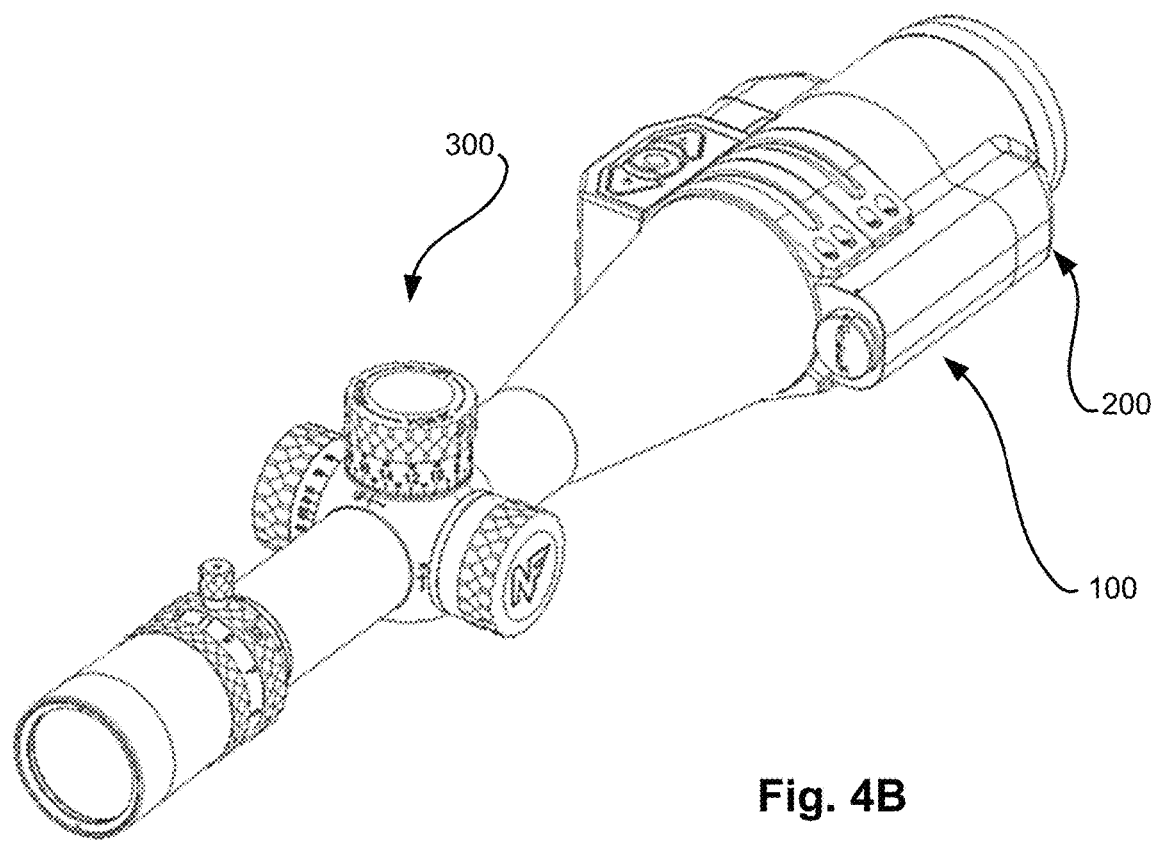
FIG. 4B illustrates a rear isometric view of the smart scope assembly of FIG. 4A.

FIGS. 4A and 4B illustrate clamp 100 and beam splitter 200 being coupled with a riflescope 300. For example, the clamp arms 112 may be positioned and tightened about the outer surface of the riflescope 300. In some embodiments, a distal end of the riflescope 300 may be positioned between the clamp arms 112. In other embodiments, the distal end of the riflescope 300 may be positioned within the opening of the collar 106, with the clamp arms 112 being coupled just inward of the distal end of the riflescope 300. In some such embodiments, the distal end of the riflescope 300 may be positioned against, or in close proximity to the beam splitter 200. While illustrated with the first lateral member 102 and the second lateral member 104 being positioned on sides of the clamp 100, it will be appreciated that the lateral members may be positioned at other locations in various embodiments. The clamp's grip on the main body of the riflescope 300 ensures that the clip-on display (e.g., beam splitter 200) rides along with the riflescope 300 during the shocks and returns to the original position after the shock.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A clip-on display for mounting to a riflescope, comprising:
    a clamp, comprising:
        a first lateral member;
        a second lateral member spaced apart from the first lateral member;
        a collar that extends between and couples the first lateral member and the second lateral member;
        a first clamp arm and a second clamp arm, wherein each of the first clamp arm and the second clamp arm comprises a fixed end that extends from the first lateral member and a free end that is coupleable with the second lateral member to tighten the respective clamp arm; and
        a beam splitter coupled with the clamp.

2. The clip-on display for mounting to a riflescope of claim 1, wherein:
    the first lateral member and the second lateral member are disposed on substantially opposing surfaces of the collar.

3. The clip-on display for mounting to a riflescope of claim 1, wherein:
    the collar is cylindrical.

4. The clip-on display for mounting to a riflescope of claim 1, wherein:
    the beam splitter is disposed at an end of the clamp opposite the second clamp arm.

5. The clip-on display for mounting to a riflescope of claim 1, wherein:
    the first lateral member comprises a power unit.

6. The clip-on display for mounting to a riflescope of claim 1, wherein:
    each of the first clamp arm and the second clamp arm is positioned about an objective-end of a riflescope.

7. The clip-on display for mounting to a riflescope of claim 1, wherein:
    each of the first clamp arm and the second clamp arm is at least generally arc-shaped.

8. A clamp for mounting a beam splitter to a riflescope, comprising:
    a first lateral member;
    a second lateral member spaced apart from the first lateral member;
    a collar that extends between and couples the first lateral member and the second lateral member; and
    at least one clamp arm, wherein the at least one clamp arm comprises a fixed end that extends from the first lateral member and a free end in shape of a wedge with a flat surface positionable against a mating surface the second lateral member via at least one fastener to tighten the respective clamp arm, wherein an inner surface of the at least one clamp arm comprises an arc-shaped surface.

9. The clamp for mounting a beam splitter to a riflescope of claim 8, wherein:
    the free end of the at least one clamp arm is coupleable with the second lateral member via the at least one fastener.

10. The clamp for mounting a beam splitter to a riflescope of claim 9, wherein:
    a longitudinal axis of each of the at least one fastener extends tangentially to an arc of the respective clamp arm.

11. The clamp for mounting a beam splitter to a riflescope of claim 8, wherein:
the at least one clamp arm defines at least one slit that extends along a portion of a length of the respective clamp arm.

12. The clamp for mounting a beam splitter to a riflescope of claim 11, wherein:
each of the at least one clamp arm defines a groove that is positioned about the slit.

13. The clamp for mounting a beam splitter to a riflescope of claim 12, wherein:
the groove extends 360 degrees.

14. The clamp for mounting a beam splitter to a riflescope of claim 8, wherein:
the at least one clamp arm comprises:
a first clamp arm;
a second clamp arm that is laterally spaced apart from the first clamp arm;
a third clamp arm positioned opposite and facing the first clamp arm; and
a fourth clamp arm positioned opposite from and facing the second clamp arm.

15. A clamp for mounting a beam splitter to a riflescope, comprising:
a first lateral member;
a second lateral member spaced apart from the first lateral member;
a collar that extends between and couples the first lateral member and the second lateral member;
a first clamp arm;
a second clamp arm that is laterally spaced apart from the first clamp arm;
a third clamp arm positioned opposite and facing the first clamp arm; and
a fourth clamp arm positioned opposite from and facing the second clamp arm, wherein each of the first clamp arm, the second clamp arm, the third clamp arm, and the fourth clamp arm comprises a fixed end that extends from the first lateral member and a free end that is coupleable with the second lateral member to tighten the respective clamp arm.

16. The clamp for mounting a beam splitter to a riflescope of claim 15, wherein:
the free end of each of the first clamp arm and the second clamp arm are coupleable with a first surface of the second lateral member; and
the free end of each of the third clamp arm and the fourth clamp arm are coupleable with a second surface of the second lateral member opposite the first surface.

17. The clamp for mounting a beam splitter to a riflescope of claim 15, wherein:
the first clamp arm, the second clamp arm, the third clamp arm, the fourth clamp arm, the first lateral member, the second lateral member, and the collar are formed integrally from a single piece of material.

18. The clamp for mounting a beam splitter to a riflescope of claim 15, wherein:
each of the first clamp arm, the second clamp arm, the third clamp arm, the fourth clamp arm defines a slit that spans substantially all of a distance between the first lateral member and the second lateral member.

19. The clamp for mounting a beam splitter to a riflescope of claim 15, wherein:
the collar and each of the first clamp arm, the second clamp arm, the third clamp arm, the fourth clamp arm have a substantially same outer diameter.

20. The clamp for mounting a beam splitter to a riflescope of claim 15, wherein:
an inner surface of each of the first clamp arm, the second clamp arm, the third clamp arm, the fourth clamp arm comprises a roughened texture.

* * * * *